3,531,211
OPTICAL SYSTEM AND METHOD FOR CYLINDRICAL CUVETTES

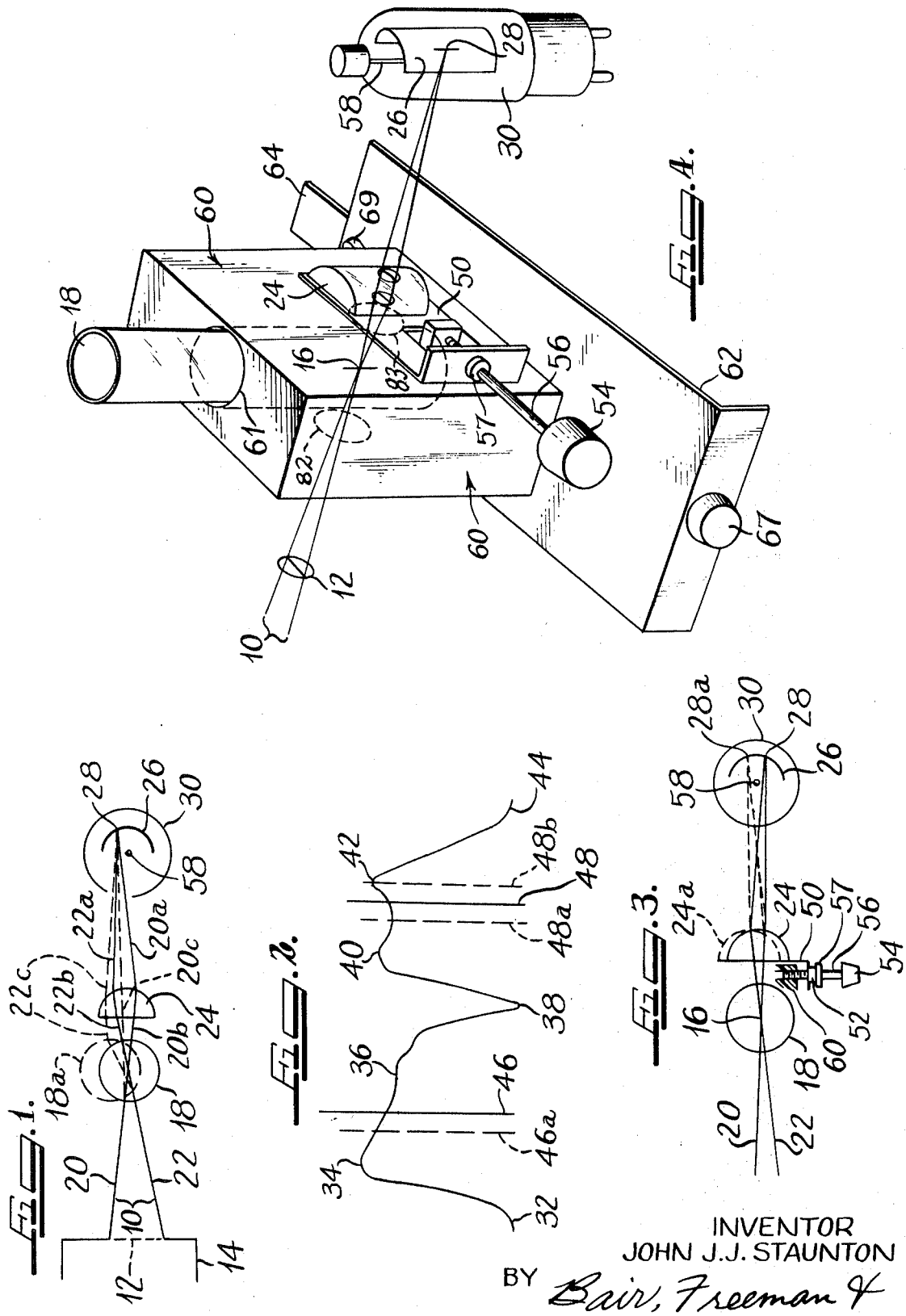
Sept. 29, 1970 — J. J. J. STAUNTON — 3,531,211
OPTICAL SYSTEM AND METHOD FOR CYLINDRICAL CUVETTES
Filed April 5, 1965 — 3 Sheets-Sheet 1
INVENTOR
JOHN J.J. STAUNTON
BY Bair, Freeman & Molinare Attys.

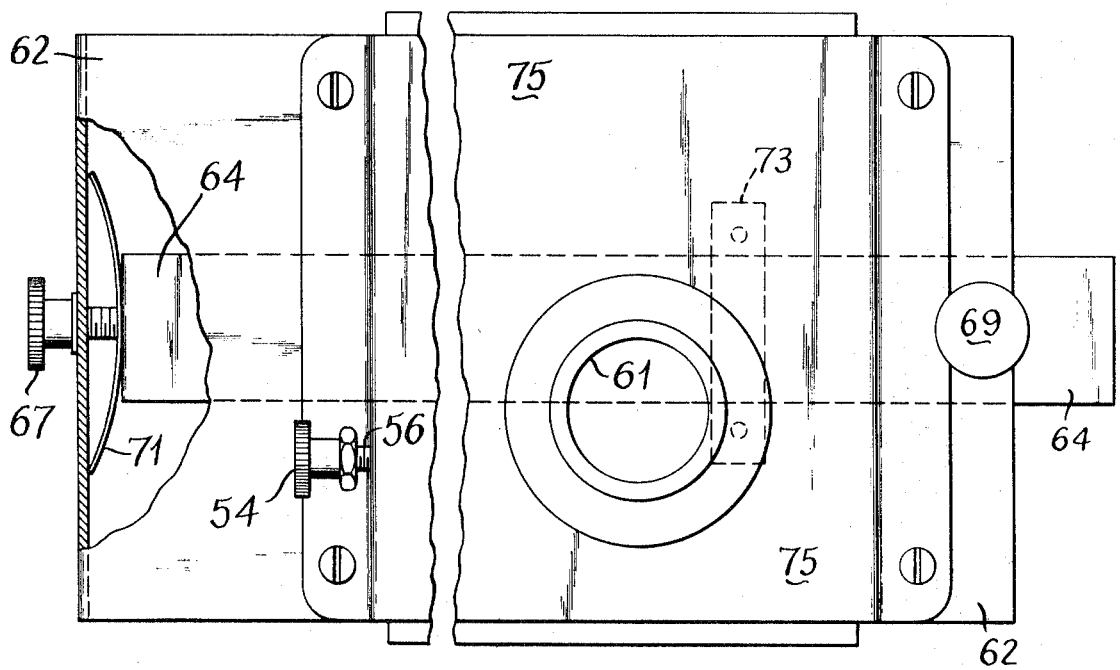

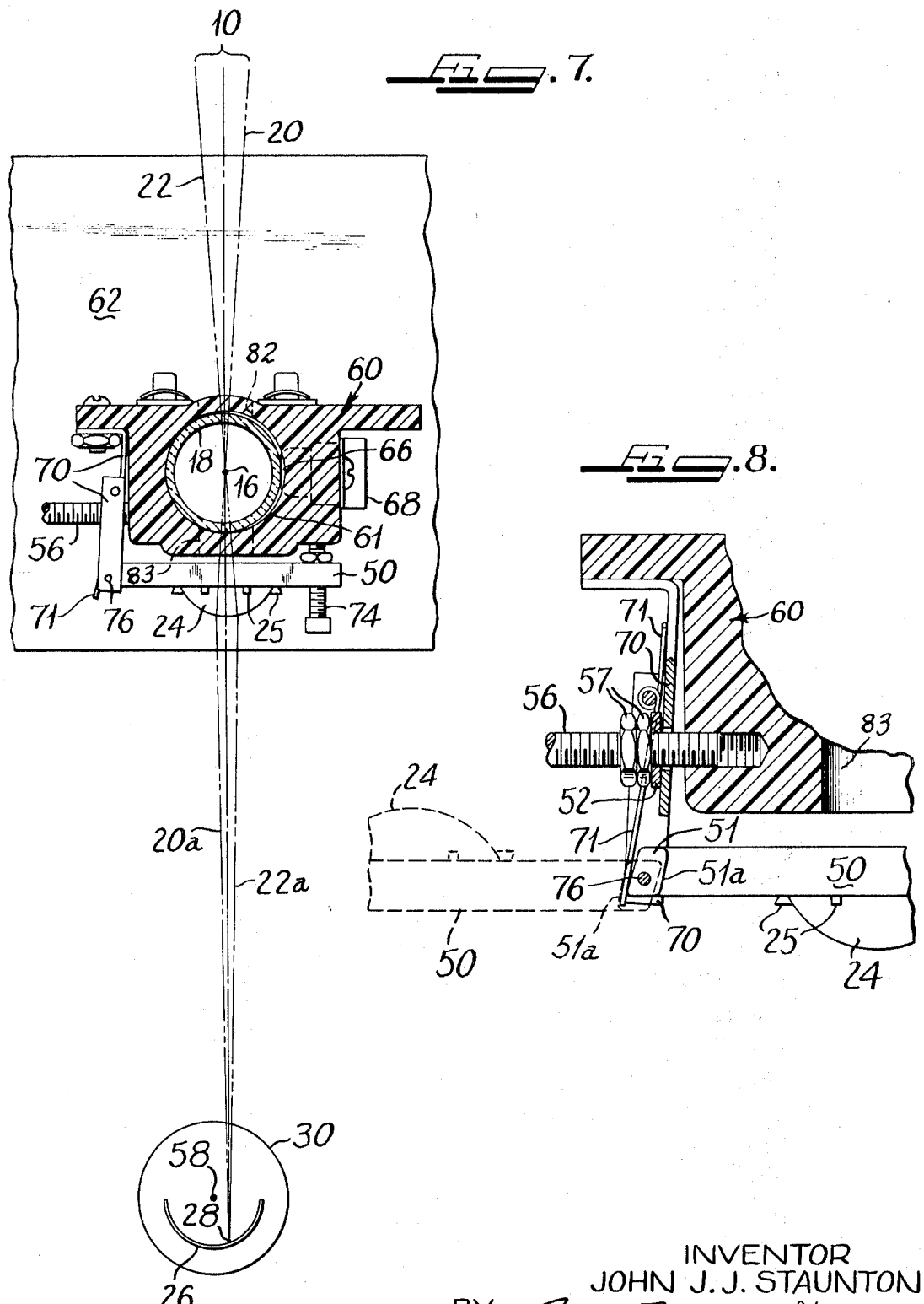

John J. J. Staunton, Oak Park, Ill., assignor, by mesne assignments, to The Perkin-Elmer Corporation, Norwalk, Conn., a corporation of New York
Filed Apr. 5, 1965, Ser. No. 445,668
Int. Cl. G01n 1/10, 21/06
U.S. Cl. 356—244   4 Claims

ABSTRACT OF THE DISCLOSURE

Apparatus for locating a cylindrical spectrophotometric cuvette in an instrument having a spectrophotometric beam projected from a light source through the cuvette to a photoreceptor for measurement of the sample in the cuvette, means being provided to locate the center axis of the cuvette at a horizontal focal point of the beam to minimize variation in photoreceptor output due to lensing power of the cuvette and further means comprising a horizontally adjustable cylindrical lens following the cuvette to refocus the beam on a selected narrow region of the photoreceptor cathode to minimize variations in photoreceptor output due to both random horizontal and rotational variations in cuvette position. The method of adjusting this apparatus also extends the useful range of the measuring instrument by utilizing the most sensitive area of the photoreceptor cathode.

---

This invention relates to an optical system and method for cylindrical cuvettes which minimizes errors, simplifies operaiton of a spectrophotometer or filter colorimeter and permits greater speed in the analysis of successive samples.

Analytical measurements made with a spectrophotometer or filter colorimeter type instrument utilize transparent containers to hold the liquid samples so that they intercept a light beam passing through the instrument. These containers or cuvettes may have two opposite walls held flat and parallel so as to distort the beam as little as possible. The distance between the inner surfaces of these walls, known as the optical depth of the cuvette, is definitely related to the instrument measurement and hence must be well controlled. In practice, measurement of a sample is expressed as a percentage of a similar measurement of a reference sample contained in the same or in an equivalent cuvette. It is, therefore, important that the cuvette per se does not introduce variables into the measurement which would become errors in the evaluation of the sample. The general theory underlying analytical measurements is well known; however, certain aspects of the use of cuvettes are pertinent to my invention and will be duly discussed.

A parallel sided cuvette is properly considered a precision optical device and is expensive and difficult to make. In many analytical laboratories where hundreds of samples are run every day there is a real demand for a less expensive sample cell. This is especially true in the clinical laboratories where the demands of cleanliness and sterilization are hard on cuvettes and breakage and losses are high. For this reason, the most generally accepted clinical spectrophotometer is one that accepts test tube type cuvettes having a circular cross section.

The use of cylindrical cuvettes of circular cross section in a photometric instrument is hedged about with difficulties which may seriously vitiate the accuracy of the results obtained. In the first place, unlike the parallel sided cuvette, the round cuvette acts like a cylindrical lens to change the convergence of the optical beam in the instrument, thus altering drastically its size and shape where it falls on the photosensitive surface in the photoreceptor or photometer. Since the lensing action is a function of the cuvette diameter, each different diameter of cuvette will produce a different effect. While the lens effect can be minimized as will be shown later, and while the greater part of the instrumental reaction to this effect is automatically compensated by measuring both the reference and sample in the same sized tube; nevertheless, commercial cuvettes though carefully selected vary enough in roundness to cause appreciable changes in beam size.

When the size of the beam falling on the sensitive surface of the photoreceptor changes, the output of the photoreceptor will also change unless the point-to-point sensitivity of the surface is constant. Prior art has had reasonable success in using round cuvettes with spectrophotometers and filter photometers where the photoreceptor is a barrier layer photo cell because such cells have a fairly uniform sensitivity across their surfaces. This condition, however, rarely holds for photoemissive devices such as photodiodes and some photomultipliers. Such devices usually have a high sensitivity near the center of their photosensitive cathode and a marked generally irregular dropoff toward the edges. If the incident radiant beam, for example, contracts in size without change in intensity, more of it will fall on the region of greater sensitivity and the phototube output will rise. Since this rise is due to an artifact of the cuvette, it constitutes an error. Prior art has had little success in using round cuvettes with photoemissive receptors.

Another artifact associated with round cuvettes is lateral displacement of the beam due to lateral shift or to rotation of the cuvette. The photometric result is similar to that described for changes in beam size. Although much control over this can be established by careful attention to proper holding means for the cuvette, nevertheless imperfect roundness of the cuvette will defeat the control of even the best mechanical locating devices by deflecting the beam to one side or the other.

Out-of-roundness and other defects to be mentioned result from the method of manufacture of commercial round cuvettes. To manufacture tubes free from these defects would require an entirely different and prohibitively expensive approach wiping out the cost reason for using round cuvettes. The machine-drawn cuvettes commonly used also exhibit longitudinal ridges or striations which cause narrow light and dark streaks to appear vertically disposed and spaced at irregular intervals across the beam. Elongated bubbles or "seeds" have a similar effect. Some of the worst of these are rejected by manufacturers of high quality cuvettes but an economical balance militates against weeding out all such defects.

Where the cuvette can be placed very close to the photoreceptor, the variations in photocurrent due to these artifacts can be minimized. In the newer general purpose spectrophotometers which must accept a wide variety of long as well as short parallel sided cuvettes, and hence must have a long beam traversing the sample compartment, close spacing of the cuvette to the photoreceptor is impractical. Furthermore, the nature of photoemissive devices, the more generally necessary receptor for such instruments, does not permit the hazards of such close spacing. With the longer spacing the difficulty of using round cuvettes is compounded.

One of the objects of my present invention is to provide a novel cuvette holder for round cuvettes that substantially eliminates the errors due to variations in roundness of such cuvettes when used in a spectrophotometer or filter photometer.

Another object is to provide a holder and lens combination which provides means for utilizing the most sensitive region of the phototube cathode for measurement, thus extending the useful range of wave lengths of the measuring instrument.

Still another object is to provide a novel holder combination to minimize the instrument error normally occasioned by such artifacts as striae and seeds in the cuvette.

A further object is to provide a holder and lens combination that has the advantage of ease and speed with which cuvettes may be exchanged for measurement purposes.

Still a further object is to provide such a combination which has the adaptability to a wide variety of cuvette sizes and shapes.

An additional object is to provide a method of reducing measurement variations when using cylindrical cuvettes in a measuring instrument consisting of the steps of bringing a light beam to a focal real image in the cuvette reception area, locating the central axis of the cuvette to substantially coincide with the image, interposing a lens subsequent to the cuvette so as to form a second focal image at the photoreceptor receiver and translating the second focal image laterally relative to the receiver to locate it at a region on the receiver where lateral response gradient is low.

The principal sources of error making the use of round cuvettes inaccurate in spectrophotometric equipment using photoemissive detectors are:

(1) Translation of the cuvette either transversely to the beam or along the beam. This causes the beam beyond the cuvette to swing across the phototube cathode in the former case and causes its size to change in the latter.

(2) Rotation of the cuvette. This is associated with out-of-roundness which reverts to translational effects or is associated with striae, seeds, scratches or other cuvette defects which produce shadows that travel across the beam spot where it strikes the phototube cathode.

(3) Lens action of cuvettes because of its variation with cuvette size creates a problem of control of beam size and shape at the phototube cathode. This may restrict the instrument to use of only one size of cuvette. Furthermore, minor changes in cuvette diameter may cause disproportionate variation in phototube response similar to those caused by translation along the beam.

It is an overall object of my invention to substantially reduce or eliminate errors due to all three sources.

With these and other objects in view, my invention consists in the construction, arrangement and combination of the various parts of my optical system for cylindrical cuvettes, and in the method of its use, whereby the objects above contemplated are attained, as hereinafter more fully set forth, pointed out in my claims and illustrated in detail on the accompanying drawings, wherein:

FIG. 1 is a diagrammatic plan representation of the optical system of my invention illustrating the effect of transverse shift of the cuvette;

FIG. 2 is a graphical representation of the sensitivity variation across a typical phototube cathode;

FIG. 3 is a diagrammatic plan view somewhat similar to FIG. 1 showing the method by which transverse shift of the beam across the cathode may be effected;

FIG. 4 is a somewhat diagrammatic simplifier perspective view of a preferred embodiment of my invention;

FIG. 5 is a plan view showing in detail how one form thereof may be designed for production;

FIG. 6 is a front elevation of FIG. 5;

FIG. 7 is a sectional view on the line 7—7 of FIG. 6 and shows the relationship of a phototube to a cuvette in a holder, and FIG. 8 is an enlarged sectional view on the line 8—8 of FIG. 6.

On the accompanying drawings I have used the reference numeral 10 to indicate a light beam emerging from the exit window 12 of the monochromator section of a spectrophotometer 14 which is caused by conventional means therein, such as a lens or mirror, to come to a focus at the point 16 where a vertically elongated image of the exit slit of the monochromator will be formed. A cuvette or sample cell is shown at 18 located by a suitable holder 60 so that its vertical center axis is colinear with the focus point 16. Inspection of typical marginal rays 20 and 22 will show that they enter and leave the cuvette normal to the cuvette walls, vertical skew being neglected for the sake of simplicity of discussion, and hence these rays will travel of the same path through the center of the cuvette irrespective of cuvette size as long as the cuvette is centered. This is an essential and desirable feature of my invention aimed at eliminating errors due to the lens action of the cuvette.

On leaving the cuvette, the beam (see marginal rays 20$^b$ and 22$^b$ in FIG. 1) enters a plano-convex cylindrical lens 24 which is so placed as to reconverge the beam 10 (marginal rays 20$^a$ and 22$^a$) to a focus (image 28) substantially at the surface of the cathode 26. The image 28 so formed will be a narrow vertical line. The cathode 26 on which the image 28 falls is that of a measuring phototube 30.

Prior art practice has traditionally been to spread the beam over a substantial part of the cathode area when a photoemissive device is used. This practice which originated with early instruments having necessarily high intensity beams is designed to avoid locally heating or fatiguing the phototube cathode by excessive concentration of energy at one place thereon. With modern instruments the danger of over-concentration no longer exists but the tradition persists. I shall discuss presently the unexpected advantages resulting from my departure from this tradition. Before going into this, however, I shall show that the use of the cylindrical plano-convex lens 24 lessens the problem of maintaining lateral stability in the positioning of the cuvette.

Attempts to employ round cuvettes have always been plagued by the fact that any lateral displacement of such a cuvette, unlike a parallel sided cuvette, would swing the beam emerging from the cuvette through an angle which increased even more rapidly than the displacement. The resultant lateral shift of the beam at a phototube cathode could not be tolerated if reasonable accuracy of measurements was to be had. Although many ingenuous devices were evolved with the purpose of accurately locating the cuvette, variations in size and departures of the cuvette from truly circular shape defeated their purpose by allowing lateral shifts from cuvette to cuvette and by being unable to prevent such shifts from happening as a given cuvette was rotated about its own axis.

That the combination of elements in my invention reduces the effect of lateral cuvette displacement may be seen by reference again to FIG. 1 where the cuvette is shown in a displaced position represented in dotted lines at 18$^a$, the displacement being shown grossly exaggerated as the shift would in actual practice be only a few thousandths of an inch. The correspondingly displaced marginal rays are shown at 20$^c$ and 22$^c$. It will be apparent that the displacement of these rays from a central position as they pass through the lens 24 brings a prismatic deviation into play by the lens causing the displaced rays to be imaged in substantially the same position on cathode 26 as originally but at a slightly different angle. Such an action by the lens is known as "telecentric," and while telecentricity is not unknown to other prior art I believe the use of this telecentric system resulting as will be shown in other unexpected and desirable results is a novel contribution to the art of photometric measurement.

To understand better the effect of lateral displacement of the optical beam at the phototube cathode, reference is now had to FIG. 2. This is a representation of a typical point-to-point sensitivity curve of a phototube cathode made by moving a narrow vertically elongated spot of light across the cathode horizontally and recording the phototube response during this traverse. At 32 the light spot enters onto the cathode at one side. As the spot progresses toward the center of the cathode, the response rises rapidly to some peak value such as 34. It may then level off or decline. Every phototube has a different shape of curve as far as the minor details are concerned. After passing various irregularities 36 near the central part of the cathode, the response declines sharply to a minimum value 38 as the shadow of the central anode wire obscures the cathode. While a phototube may be made with a frame anode instead of a center wire to avoid this minimum I have found such tubes, for reasons not pertinent to this disclosure, to be deficient in linearity. The central anode is common to commercial phototubes.

The remainder of the curve is very roughly symmetrical to the first half, rising through irregularities 40 similar to 36 to a peak valve 42 similar to 34 and declining at the edge of the cathode abruptly to a low value 44.

With prior art arrangements the beam would fall on the cathode as an extended fairly wide spot whose edges can be typically represented by vertical lines 46 and 48. The effect of shifting this spot laterally on the cathode to position 46ª, 48ª will be a rise in response at the 46ª edge and little change at the 48ª edge. In this case, therefore, the net change will be a rise in response. In the general case, the change may be a rise or a drop but will in most cases be an objectionable change.

The effective change of beam size may also be demonstrated in FIG. 2 by referring to a case where the beam expands from 46, 48 to 46ª, 48ᵇ. In this case, the response will show a net rise as both edges of the beam move to higher response regions.

Prior art efforts have been made to minimize the effects of beam shift by interposing a scatterer or diffuser glass between the cuvette and the phototube so that the edges of the beam will be ill defined and the changes lessened. This I have found to be poor practice because such a diffuser causes a great loss of light if sufficient diffusion to improve stability of readings on both cuvettes is to be had, largely because much of the light then misses the phototube cathode completely or is absorbed into the diffuser. A diffuser of less scattering ability I have found to be of little value where it permits the whole beam to fall on the cathode. The primary means of stabilizing against reading variations due to cuvette shifts is a carefully designed positive means of locating the cuvette but this cannot take care of cuvette eccentricity. All such devices must locate from the outside surface of the cuvette. This surface in the present state of the art cannot be held exactly concentric with the inner wall or axis of the cuvette without prohibitive cost. Hence even with the best mechanical locating means for the cuvette there will be residual variations in beam position and size on the cathode. Beam position as indicated above cannot practically be corrected by diffusers of the prior art but is successfully obviated by the telecentric feature of my invention. The elimination of change of beam size on the cathode is a further feature of my invention now to be discussed.

The key to elimination of variations in response caused by change of beam size at the cathode is the unorthodox procedure of focusing the beam image 28 on the cathode 26 of the phototube. To show how this can be done, reference is again had to FIG. 2. A study of a number of these curves at different wave lengths and on different phototubes shows that while there are differences in shape from one to another, all show maxima such as 34 and 42, and generally at least one plateau such as 36 or 40. In any of these regions the narrow beam which generated the curve could be moved sideways or varied in width, although not much so at 42, without changing the phototube response rapidly. My invention, therefore, focuses the beam to a narrow line image 28 on the cathode and provides means to place this beam at such a point as 34, 36 or 40 as chosen by the operator. The means for this choice is shown diagrammatically in FIG. 3 where the lens 24 is shown attached to a support 50 which can be moved laterally by the coaction of a shoulder 57 with a thrust washer 52, a knob 54 turning a screw 56 providing the motivation. It will be apparent that movement of the lens from position 24 to a postion such as 24ª will swing the focus point of the beam from 28 to 28ª which might correspond to moving from 36 to 40 of FIG. 2. As beam traverses the anode 58, the response dip 38 will occur.

In practice the operator of the spectrophotometer will insert a cuvette of solution into the holder shown generally at 60 in FIG. 4. He would set the wave length of the monochromator at the proper value and adjust the readout of the instrument to some upscale position. Upon turning the knob 54 the readout would move following the response value of a curve similar to that of FIG. 2. Observation of the readout would enable the operator to easily set the beam at a place where the reading was high and changed slowly such as 40. At this setting the variations in reading due to translation of the cuvette or variations in roundness would be negligible thus accomplishing the purpose of my invention as previously discussed in detail.

Another and surprising advantage results from bringing the beam to a focus at the surface of the cathode 26. This is the great reduction in variations of phototube response occasioned by rotation of the cuvette. It is not generally practical to mount or hold the cuvette so as to prevent rotation although most better grade cuvettes are indexed or marked to indicate how they should be placed in the cuvette well. If a cuvette is rotated, striae, scratches and seeds will produce shadows in the beam as they traverse it horizontally. Of course, if an absorbing effect such as an opaque line or a deep scratch enters the beam the amount of light in the beam will drop. No device or method of holding the cuvette can prevent such an artifact from causing trouble and such a cuvette should be discarded, or indexed so that the defect will not be in the beam when the cuvette is placed properly in the holder. On the other hand, striae and seeds often merely deflect some of the light in the beam without absorbing it so as to cause a darker streak at one place in the beam and a lighter streak adjacent to the dark streak. With the traditional wide cathode spot the light streak may fall on a region of higher sensitivity such as 40 in FIG. 2 causing a higher phototube response; rotation of the cuvette, however, will move this streak across the spot causing response to vary.

Unlike the variation of prior art arrangements just discussed, the result of focusing the beam into a narrow line on the phototube cathode as practiced by my invention is that such variations substantially disappear. The reason for this is that the whole beam is concentrated horizontally into a narrow substantially equal response area on the cathode in which:

(1) No separation or distinguishable horizontal motion of the images of seeds, striae and the like exist, and (2) No change due to such motion, if present, would result.

Barring actual absorbing defects of the cuvette then, the carrier 60 embodied in this invention substantially eliminates variation in cuvette transmission due to rotation of the cuvette.

As has been previously pointed out, the operator is provided with means to translate the cylindrical or planoconvex lens 24 laterally to select a suitable position such as 40 in FIG. 2 where the response curve is level and changes little with horizontal displacement of the beam. This provision also gives another advantage; the response available is increased over that of an extended, diffuse beam. This is true even if the diffuse beam is all contained within the area of the cathode because the loss occasioned by interception of part of the beam by the anode (at 38, FIG. 2) is avoided. At spectral extremes where response is low it is a real advantage to have this extra response available.

To exemplify a preferred embodiment of my optical system herein disclosed, attention is now drawn to FIG. 4 wherein a metal base plate 62 is equipped with horizontal and vertical locating means, viz., stationary locator strip 64. The position of the base plate is adjusted by a screw 67 and serves to support the cuvette holder 60 in the form of a block of plastic with openings 82 and 83 so that the beam of the spectrophotometer passes through and focuses at the center 16 of the cylindrical cavity in this block which forms a cuvette receiving well. The adjustment 67 centers the beam in the well 61 initially so that with a perfectly concentric cuvette there will be no deflection of the beam horizontally. The well takes a certain diameter of cuvette (slightly less than the internal of the well itself) which is held firmly located by a plunger 66 which may be of some suitable material such as nylon and which is spring-loaded by a spring 68 as shown in FIGS. 6 and 7 fitted into the sidewall of the well. Smaller cuvettes require a plastic adapter sleeve or bushing (not shown) which locates in the well like the maximum-diameter cuvette and which in turn accepts coaxially smaller cuvettes with suitable spring means for stabilizing the latter. Each size of cuvette requires its proper type of adapter so that in all cases the center axis of the cuvette being used is coincident with the center axis of the cuvette well subject to the limitations imposed by non-concentricity of the cuvettes and adapters which have been already discussed. Such adapters, however, form no part of my present invention and, accordingly, are not shown.

The locator strip 64 is adapted to be fixed in relation to the spectrophotometer 14 and the phototube 30, and the base plate 62 adjusted in relation to the locator strip. Referring to FIGS. 5 and 6, the locator strip 64 is so held and the base plate 62 is so arranged as to be translated longitudinally of the strip 64 by the adjusting screw 67 threaded into a boss 65 of the locator strip 64. A leaf spring 71 serves to bias the base plate 62 toward the left and the adjusting screw 69 serves to adjust the base plate 62 vertically. The base plate 62 is guided on the locator strip 64 by the adjusting screw 67 and the spring 71 at the left-hand end and by a metal strap 73 at the right-hand end.

The adjusting screw 56 is threaded into the cuvette block 60. This is shown in FIGS. 6 and 8. The shoulder 57 of FIG. 4 is shown in FIGS. 6 and 8 in the form of a pair of lock nuts 57 to engage the washer 52. A pair of lock nuts 59 engage a washer 81 against a U-frame 75 mounted on the base plate 62, the lock nuts 59 being adjusted so that three or four turns of the adjusting screw 56 are possible.

The lens support 50 is provided with a pair of cam-like hubs 51 which in the solid line position of FIG. 8 tend to rotate the support 50 counterclockwise to normally hold the stop screw 74 in contact with the cuvette block 60 under the action of a detenting spring 78. When the support is swung counterclockwise through approximately 180°, the side 51ª of the cam 51 will be engaged by the arms of the detenting spring 78 to hold the support in non-functioning position and thereby the lens in non-functioning position.

The cylindrical lens 24 is supported by a frame 50 already referred to in connection with FIG. 3 with which it may be molded integrally. This lens may be made of glass and held to the surface of the frame 50 by holding studs 25. However, I have found it more economical to mold it of a clear plastic such as methylmethacrylate in a mold having optically finished surfaces because of the high quality of flat and cylindrical curvatures required. The curvature and dimensions of the lens are those suited to the particular instrument with which the device is being used, as will be apparent to one skilled in optics, the focal requirement being that the beam of the spectrophotometer, after being brought to a focus at the center of the cuvette well, be again brought to a narrow line, substantially a focus, at the cathode of the phototube. The determination of the curvature required may be done by ray tracing or by experiment in a well known manner. It is essential that the width of the lens be great enough as measured horizontally across the plane face that the whole beam leaving the cuvette not be clipped by the edge of lens when the latter is moved horizontally far enough to deviate the beam to the edge of the cathode.

For the purpose of accomplishing the horizontal adjustment of the lens 24 previously referred to, the lens frame 50 may be pivoted at 76 to a spring bracket 70 (see FIGS. 6, 7 and 8) made of spring metal and secured to the cuvette block 60. An adjusting screw 56 threaded in the cuvette block can apply pressure through a fiber washer 52 on the metal bracket 70 so as to crowd its free end toward the cuvette well thus moving the lens frame horizontally across the beam. A stop screw 74 guides the frame 50 and makes an initial adjustment of lens position possible wherein the plane face of the lens is parallel to the adjacent beam exit face of the block 60.

When parallel sided cuvettes are used with suitable adapters in the cuvette well, the lens 24 on its frame 50 may be swung about the pivot 76 out of the beam, the detenting spring 78 then coacting with the hubs 51 to hold the frame in a stored position alongside the adjusting screw 56 as shown by dotted lines in FIG. 8. The lens is not used in the ultraviolet below about 340 millicrons, a region below which the plastic of the lens would absorb too much. If use in this region were essential, a quartz lens would be practical but more costly. Above 340 mm$\mu$ the lens is optional with parallel sided cuvettes; however, I have found it beneficial even with such cuvettes if variations exist in the parallelism of the cuvette walls or in the case of cuvettes with striae or which are not properly restrained in the adapter. Although the discussion herein has dealt with phototubes of the emissive type using solid cathodes, my invention is not limited thereto but would be also effective with photomultipliers, phototransistors or other solid state photo devices or any photoreceptor, the receiver of which shows lateral variation of response. It is also to be understood that the means for forming the first focal image at the center of the cuvette if not part of the spectrophotometer may be made part of the optical system herein described if this system is treated as an accessory or adjunct to the spectrophotometer. The mechanical disposition of parts, focal lengths and other parameters of the particular device depend on the dimensions of the spectrophotometer with which the device is to be used and are not limitations of the invention.

As to the method disclosed, measurement variations are reduced when using cylindrical spectrophotometer cuvettes by bringing the spectrophotometer beam to a focal real image in the cuvette reception area, locating the central axis of the cuvette to substantially coincide with the image and interposing a cylindrical lens subsequent to the cuvette so as to form a second focal image at the photoreceptor receiver. The second focal image can then be translated laterally relative to the receiver to locate it at a desired region on the reeciver as described in reference to FIG. 2.

The method and apparatus heretofore outlined also are unexpectedly advantageous for microcuvettes. A cuvette of this type is typically less than 2 mm. horizontal width by 1.0 cm. optical path length, measured along the axis of the beam. By placing this cell, like the cylindrical cuvette, at the first focal point 16, all of the narrow focussed beam can enter the 2 mm. width of the cell. In prior art designs such a cell would have to be located very precisely as any skewing or rotation of the cell would shift the emerging beam laterally causing photometric error. With my system such a shift, like that previously discussed for a cylindrical cuvette on page 10 paragraph 1 and shown in FIG. 1, would be nullified by the telecentricity of the cylindrical lens thus increasing the reproducibility and ease of using microcuvettes in a similar way as for cylindrical cuvettes.

To further cooperate in the use of a microcuvette in my invention the adjusting screw 69 (FIG. 6) pushes against the locator strip 64 bending it down and thus elevating the plate 62 at the right-hand end and with it the cuvette block 60 and the cuvette therein contained. By this means the operator can vertically adjust the cuvette so that the beam just grazes the inside bottom of the cuvette thus permitting measurement of a minimum sample.

Some changes may be made in the construction and arrangement of the parts of my optical system for cylindrical cuvettes and the steps of the method may be modified to some extent without departing from the real spirit and purpose of my invention, and it is my intention to cover by my claims any modified forms of structure or use of mechanical equivalents, and any modification of the method involved which may reasonably be included within their scope.

I claim as my invention:

1. A spectrophotometric apparatus which comprises, in combination:
    (a) a holder for a cuvette;
    (b) a removable cylindrical cuvette vertically-disposed in said holder for receiving a test sample;
    (c) photoreceptor means on one side of said holder and having a surface with areas of relatively high sensitivity and other areas of relatively low sensitivity manifested by a plateau and surrounding valleys respectively on a sensitivity curve;
    (d) a light source on the other side of said holder for projecting a spectrophotometric beam through said cuvette to said surface;
    (e) an image-producing exist slit disposed between said light source and said holder;
    (f) means for forming a first real vertical line image of said slit concident with the vertical axis of said cuvette; and
    (g) optical means between said cuvette and said photoreceptor for forming a real line image of said first real image on an area of relatively high sensitivity, thereby minimizing spectrophotometric errors associated with rotational and translational play of said cuvette.

2. A spectrophotometric apparatus comprising in combination:
    (a) holder for a cuvette;
    (b) a removable cylindrical cuvette of round cross-section vertically disposed in said holder for receiving a test sample;
    (c) photoreceptor means on one side of said holder and having a surface with areas of relatively high sensitivity and other areas of relatively low sensitivity manifested by a plateau and surrounding valleys respectively on a sensitivity curve;
    (d) a light source including slit means on the other side of said holder for projecting a light beam through said slit and said cuvette to said photoreceptor surface;
    (e) optical means for forming a first real vertical line image of said slit coincident with vertical axis of said cuvette;
    (f) a cylindrical lens disposed between said cuvette and said photoreceptor for receiving the light beam transmitted through said cuvette; and
    (g) means for positioning said lens to form a real line image of said first real image on the area of said surface having high sensitivity, thereby minimizing spectrophotometric errors associated with rotational and translational play of said cuvette.

3. A spectrophotometric apparatus according to claim 2 wherein said lens positioning means comprises means for positioning said lens horizontally in a plane transverse to the direction of said light beam.

4. A spectrophotometric apparatus according to claim 2 further comprising means permitting the removal of said lens from the path of said beam.

References Cited

UNITED STATES PATENTS

| | | | |
|---|---|---|---|
| 2,744,440 | 5/1956 | Robertson et al. | 250—43 X |
| 2,912,593 | 11/1959 | Deuth. | |
| 2,982,170 | 5/1961 | Wyss | 356—201 X |
| 3,062,964 | 11/1962 | Lubin. | |
| 1,387,267 | 8/1921 | Holle | 350—190 |
| 2,193,437 | 3/1940 | Summerson. | |
| 2,232,169 | 2/1941 | Diller. | |
| 2,477,208 | 7/1949 | Rouy. | |
| 2,730,004 | 1/1956 | Badger et al. | |
| 2,775,159 | 12/1956 | Frommer. | |
| 2,999,417 | 9/1961 | Isreeli. | |
| 3,248,551 | 4/1966 | Frommer. | |
| 3,320,149 | 5/1967 | Isreeli. | |

FOREIGN PATENTS

| | | |
|---|---|---|
| 682,289 | 9/1939 | Germany. |

RONALD L. WIBERT, Primary Examiner

W. A. SKLAR, Assistant Examiner

U.S. Cl. X.R.

250—218; 350—190; 356—246